(12) United States Patent
Endo (10) Patent No.: US 7,486,329 B2
(45) Date of Patent: Feb. 3, 2009

(54) FOCUSING STATE SIGNAL OUTPUT APPARATUS FOR A MICROSCOPE REPRESENTING A RELATIVE DISTANCE BETWEEN A SUBJECT AND AN IMAGE SENSING APPARATUS

(75) Inventor: Hideaki Endo, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 692 days.

(21) Appl. No.: 10/306,479

(22) Filed: Nov. 27, 2002

(65) Prior Publication Data
US 2003/0098921 A1 May 29, 2003

(30) Foreign Application Priority Data
Nov. 29, 2001 (JP) ............................. 2001-364974

(51) Int. Cl.
*G03B 13/00* (2006.01)
(52) U.S. Cl. .................... 348/345; 348/79; 359/382; 359/383
(58) Field of Classification Search ......... 348/345–356, 348/79; 359/382, 383
See application file for complete search history.

(56) References Cited

U.S. PATENT DOCUMENTS 4,971,445 A * 11/1990 Sato et al. .................. 356/601
5,912,699 A * 6/1999 Hayenga et al. ............. 348/132
6,580,571 B2 * 6/2003 Sasaki et al. ................ 359/823
2001/0030915 A1 * 10/2001 Suzuki ..................... 369/44.29

FOREIGN PATENT DOCUMENTS

| JP | 56-078824 | A |   | 6/1981  |
|----|-----------|---|---|---------|
| JP | 05-103246 | A |   | 4/1993  |
| JP | 06-222275 |   | * | 8/1994  |
| JP | 10-111445 | A |   | 4/1998  |
| JP | 10-260363 | A |   | 9/1998  |
| JP | 11-167060 | A |   | 6/1999  |
| JP | 11-271623 | A |   | 10/1999 |

* cited by examiner

*Primary Examiner*—Lin Ye
*Assistant Examiner*—Anthony J Daniels
(74) *Attorney, Agent, or Firm*—Frishauf, Holtz, Goodman & Chick, P.C.

(57) ABSTRACT

A focusing state signal output apparatus comprises, an optical detection part configured to detect a reflected light from a sample, and an output part configured to output an a focusing state signal, which is a signal showing a focusing state of the sample, has inverse sign on both sides of a focused position and shows continuous change of a voltage level crossing a zero at the focused position.

12 Claims, 9 Drawing Sheets

| Magnification of objective | Type of microscopy | | | |
|---|---|---|---|---|
| | Bright-field | Dark-field | Polarization | ... |
| 5× | $P_{11}$ | $P_{12}$ | $P_{13}$ | $P_{1n}$ |
| 10× | $P_{21}$ | $P_{22}$ | $P_{23}$ | $P_{2n}$ |
| 20× | $P_{31}$ | $P_{32}$ | $P_{33}$ | $P_{3n}$ |
| 50× | $P_{41}$ | $P_{42}$ | $P_{43}$ | $P_{4n}$ |
| 100× | $P_{51}$ | $P_{52}$ | $P_{53}$ | $P_{5n}$ |
| ⋮ | $P_{m1}$ | $P_{m2}$ | $P_{m3}$ | $P_{mn}$ |

FOCUSING STATE SIGNAL OUTPUT APPARATUS FOR A MICROSCOPE REPRESENTING A RELATIVE DISTANCE BETWEEN A SUBJECT AND AN IMAGE SENSING APPARATUS

CROSS-REFERENCE TO RELATED APPLICATIONS

This application is based upon and claims the benefit of priority from the prior Japanese Patent Application No. 2001-364974, filed Nov. 29, 2001, the entire contents of which are incorporated herein by reference.

BACKGROUND OF THE INVENTION

1. Field of the Invention

The present invention relates to a focusing state signal output apparatus applied to, for example a microscope, for outputting a focusing state signal, which represents a focusing state corresponding to a relative distance between an objective of the microscope and a sample.

2. Description of the Related Art

Currently, a microscope able to observe a microscopic sample and further to record the observed image as a video image is widely utilized extending from researches in the biological field to inspection processes in the industrial field. In using this kind of microscope, focusing operation is generally performed by adjusting the focus of the sample through operating a focusing handle.

However, in the case where, for example, an objective with high magnification (hereinafter, also called a "high magnification objective") is used, it is difficult to perform promptly the focusing operation because the high magnification objective has a narrow range of focusing due to its small depth of focus. Therefore, there has been a problem that the focusing operation needs considerable skill resulting in fatigue of an operator and decrease in production efficiency. It is very important to solve this problem for reducing inspection time through performing the prompt focusing operation particularly in a routine work such as an inspection process.

Then, various kinds of automatic focusing (AF) apparatus used for a microscope, which make the automatic focusing operation possible, have been proposed. In addition, a variety of apparatus aiming improvement of the AF apparatus have also been proposed.

For example, for the AF apparatus used in the industrial field, the following items have been required in addition to enhancement in the operational easiness and the throughput described above. For example:

(1) Detecting and measuring all the defects in each layer and all the line widths between patterns in the case of a sample with bumps on the surface such as those in a multi-layered semiconductor wafer; and (2) Measuring microscopic bumps on the sample with high precision.

Accordingly, an apparatus having performance suitable to these inspection and measurement has been proposed.

In the AF apparatus used in the industrial field, because of availability for a sample, reduction of AF time, etc. the apparatus of the so-called active AF type where a light beam such as infrared laser is projected on the sample and then the focusing operation is performed detecting a state of the reflected light beam prevails.

On the other hand, in the AF apparatus used in the biological field, because of requirement for more precise focusing, application to a transmission type sample with too low reflectivity to be detected by the active AF type, etc. the apparatus of the so-called passive AF type where the AF operation is performed detecting a contrast of the observed image is used.

Now, a conventional AF apparatus of both the active type and the passive type comprises, as one body, a focusing state signal output unit and a focusing portion in order to keep the above performance. Further, the focusing state signal output unit outputs a focusing state signal, which represents the focusing state corresponding to a relative distance between an objective of a microscope and a sample. The focusing portion focuses by adjusting the relative distance between the objective and the sample according to the signal from the focusing state signal output unit.

However, recently particular AF functions have been required in optical equipment used in various inspection devices or systems. Most of the optical equipment drive, by part of particular manners, a stage for mounting the sample, a revolver for loading the objective, or the like, which compose the focusing portion.

In order to realize the stable AF function independently of a sort or a driving method of the focusing portion, grown high is a need that only focusing state signal output units are separately prepared and each apparatus manufacturer develops the apparatus for performing AF operation with the signal from the focusing state signal output unit corresponding to a driving mechanism of each focusing portion, namely a need for a separate "focusing state signal output apparatus" as the so-called OEM product.

In this situation, the most necessary requirement for the focusing state signal output unit is to realize the precise AF operation by part of outputting the signal, the so-called error signal which represents the focusing state of the sample, under the optimal states for each focusing mechanism developed by each apparatus manufacturer.

The following device is disclosed. The device employs the manner where a plurality of detection part for such an error signal are prepared and the best signal is selected corresponding to each situation (see JP 10-260363, A).

In the above device, each photoreceptor sensor of a pair of photoreceptor sensors is divided onto 3 (concentric) light-receptive surfaces. For each laser beam incident on each light-receptive surface, error signals are calculated on the basis of plural combinations of the light-receptive surfaces. Then, the optimal (a curve having a good characteristic) combination of the light-receptive surfaces is selected from a plurality of the calculated error signals depending upon the pupil diameter of the objective. Thereby, it becomes possible to perform the stable AF operation.

In the above-mentioned manner, however, the error signals are beforehand adjusted mechanically and are selected in an alternative way from the prescribed combination of the photoreceptor devices. Therefore, it is impossible to change the shape of the error signal arbitrarily. Further, since there is no idea of outputting the error signals to the external device, such an idea as to make AF operation managed by an external system is not thought out therein. Still further, it is difficult to freely customize the signals from an apparatus consisting of a complicated and precise optical system. Consequently, it is impossible to keep the sufficient performance through the mechanical selection of the error signals considering versatile availability for OEM, etc.

BRIEF SUMMARY OF THE INVENTION

A focusing state signal output apparatus according to the present invention is characterized by comprising: an optical detection part configured to detect a reflected light from a sample; and an output part configured to output an a focusing state signal, which is a signal showing a focusing state of the sample, has inverse sign on both sides of a focused position and shows continuous change of a voltage level crossing a zero at the focused position.

It is to be noted that in the present specification, the word "focusing" means that, in optical equipment such as a microscope, to adjust the relative location (interval) between the objective and the sample in order to obtain a clear image of the sample, for example in the case of the microscope.

Additional objects and advantages of the invention will be set forth in the description which follows, and in part will be obvious from the description, or may be learned by practice of the invention. The objects and advantages of the invention may be realized and obtained by the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

In the following, the embodiments of the present invention will be described according to the drawings.

Figure 1:
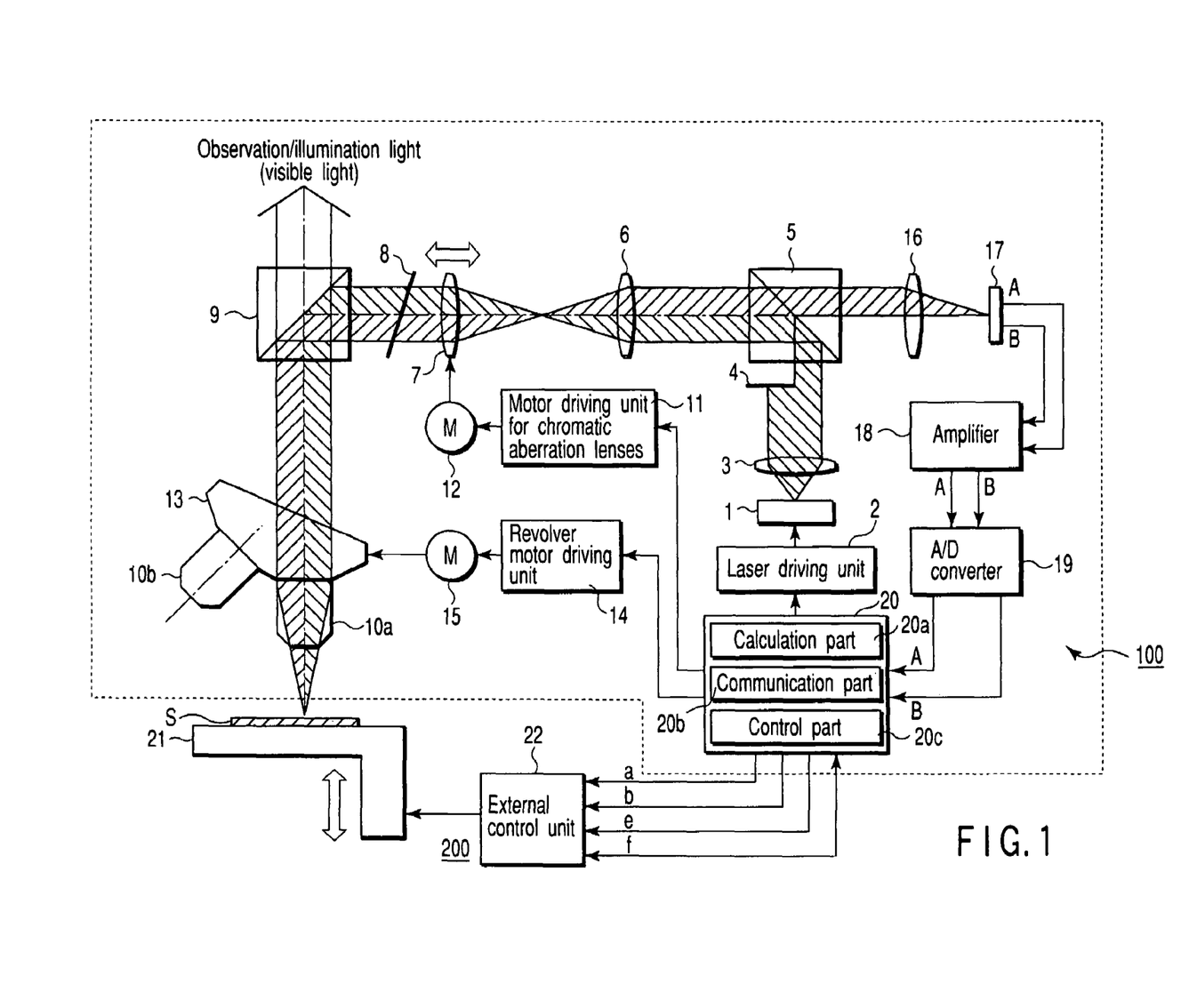
FIG. 1 is a diagram showing a schematic configuration of a microscope having a focusing state signal output apparatus to which the first embodiment of the present invention is applied.

FIG. 1 is a diagram showing a schematic configuration of a microscope to which a focusing state signal output apparatus according to the first embodiment of the present invention is applied.

In FIG. 1, an area surrounded by a broken line shows the focusing state signal output apparatus 100 according to the first embodiment of the present invention. Outside of the surrounded area, an external unit 200 having focusing part which performs a focusing operation according to a focusing state signal given by the focusing state output apparatus 100 is shown. The external unit 200 can provide entirely the same effect independently of its configuration if it only has such functions as described below.

In FIG. 1, a light source in the wavelength region of invisible light such as an infrared laser beam is used as a reference light source 1. Further, the reference light source 1 is controlled by a laser driving unit 2, which performs pulsed lighting of the light source, etc. and controls the strength of the light source.

After passing through a collimator lens 3, a laser beam from the reference light source 1 is turned into a parallel beam, and half of the light flux is cut off with an incident-side stopper 4. Then, only a P-polarized component is reflected by a beam splitter 5 and enters into a set of condenser lenses 6. Next, the light flux once condensed by the set of condenser lenses 6 passes through a set of chromatic aberration compensating lenses 7, being polarized at an angle of 45° during passing through a λ/4 plate 8, and enters into a dichroic mirror 9.

The set of chromatic aberration compensating lenses 7 compensates the gap of focusing due to the difference in wavelength between a visible light image introduced into an eyepiece not shown in the drawing through an objective 10a (10b) and the laser beam. The set of chromatic aberration compensation lenses 7 can be moved along the direction of an optical axis (in the direction of the arrow A in FIG. 1) via a drive motor 12 by a motor driving unit 11 for chromatic aberration lenses. Further, the dichroic mirror 9 has such a property that reflects only a radiation in the infrared region and makes a light beam in the visible region (a visible light) pass through itself. Thereby, the laser beam is reflected by the dichroic mirror 9, and the visible light for observing a sample (observation and illumination light) passes therethrough in the vertical direction from the objective 10a (10b) side, and the observation with the eyepiece not shown in the drawing has turned possible.

The light flux reflected by the dichroic mirror 9 forms an image in the shape of a spot (also called "a spot image", "a spot light") on the observation sample (sample) S via the objective 10a (10b).

The objectives 10a (10b) are disposed on a main body 13 of a rotatable electric revolver. The main body 13 of the electric revolver is rotated via a revolver motor 15 by a revolver motor driving unit 14. Thereby, any desired objective 10a (10b) is replaced on an optical path. In the example of FIG. 1, the objective 10a is positioned on the optical path. Further, the observation sample S is et on a sample movement stage 21 and is observed by the objectives 10a (10b).

The sample movement stage 21 can be moved up and down along the direction of the optical axis (along the direction of the arrow B in FIG. 1) by an external control unit 22. The external control unit 22 is developed independently of the focusing state signal output apparatus 100 by a system manufacturer and the like. The external control unit 22 comprises, for example, a motor and piezoelectric element as a stage driving part, and has both a function for moving the stage to any desired position on the optical axis and an AF function for inducing the observation sample S into the focus position according to an error signal a from a control unit 20 described below.

On the other hand, the light flux reflected by the observation sample S, is passing through the objective 10a (10b), reflected by the dichroic mirror 9, and is again polarized at an angle of 45° during passing through a λ/4 plate 8, and is changed into a S-polarized component. Then, the light flux having passed through a λ/4 plate 8 enters into the beam splitter 5 via the set of chromatic aberration compensating lenses 7 and the set of condenser lenses 6. Since the light flux is changed into the S-polarized component in this case, the light flux transmits the beam splitter 5 as it is and forms its image on a photo-detector 17 after further passing through a set of condenser lenses 6.

The photo-detector 17 comprises two photodiodes (sensor A, B) arranged around the centered optical axis. The spot imaged is converted by the photo-detector 17 into electric current/voltage and then amplified by an amplifier 18 to such a voltage level as to be processed with ease. That is to say, an analogue signal output from the photo-detector 17 is input to the control unit 20 after converted into a digital signal by the A/D converter 19.

The control unit 20 comprises a calculation part 20a, a communication part 20b, and a control part 20c. The calculation part 20a calculates an error signal a representing the focusing state of the observation sample S according to the output from the photo-detector 17, various focusing decision signals b corresponding to the focusing states described below, an AF operation enable signal e, etc. The communication part 20b performs exchange of data f with the external control unit 22 of the external unit 200. Further, the communication part 20b is, for example, means such as RS-232C by which bi-directional communication is possible. The control part 20c gives some control instruction to the laser driving unit 2, the motor driving unit 11 for the chromatic aberration lenses, and the revolver motor driving unit 14. In this case, the error signal a, which represents the focusing state of the observation sample 8, calculated by the calculation part 20a can be output as an analogue signal, and the focusing decision signal b and the AF operation enable signal e can be output at a logic level.

Figure 2:
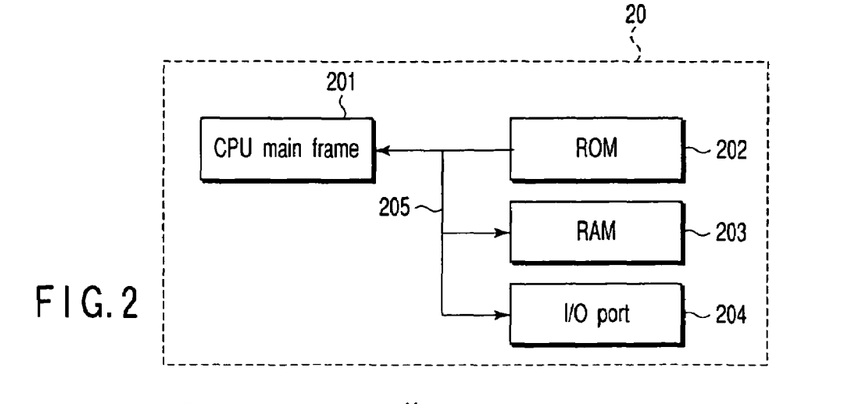
FIG. 2 is a diagram showing a concrete configuration of a control unit used in the first embodiment.

FIG. 2 is a diagram showing a concrete configuration of the control unit 20. In FIG. 2, the control unit 20 comprises a CPU main frame 201, a ROM 202, a RAM 203, and an I/O port 204. The CPU main frame 201 is a well-known CPU (Central Processing Unit) circuit. The ROM 202 stores a program controlling the system. The RAM 203, which is a volatile memory, etc. stores data necessary for controlling. The I/O port 204 performs input and output of control signals. The control unit 20 additionally includes well-known peripheral circuits such as an oscillator not shown in the drawing necessary for controlling the CPU main frame 201, an address decoder. Further, the control unit 20 controls each of the peripheral equipment via the I/O port 204 and a data bus 205.

Next, the operations will be described about the case where detection of the focused position is performed according to the instruction given by the external unit 200.

Once the operation of detecting the focused position starts, the control unit 20 gives the instruction to the laser driving unit 2 in order to irradiate a spot for detecting the focused position onto the observation sample S. According to this instruction, the laser driving unit 2 starts the oscillation of the reference light source 1.

The light flux from the reference light source 1 is irradiated as a spot onto the observation sample S. The light flux reflected by the observation sample S is projected onto the photo-detector 17. The calculation part 20a of the control unit 20 calculates the error signal a, which represents the focusing state, on the basis of the position and the intensity of the spot projected onto the photo-detector 17.

Now, a method of detecting the focusing state will be described. Assuming the case where the position of the sample movement stage 21 is below the focused position, i.e. far from the objective 10a (hereinafter called a "rear focus"), the spot image formed on the photo-detector 17 by the laser beam from the reference light source 1 is imaged into a large area on the sensor B side of the center as shown in FIG. 3C.

Figure 3A:
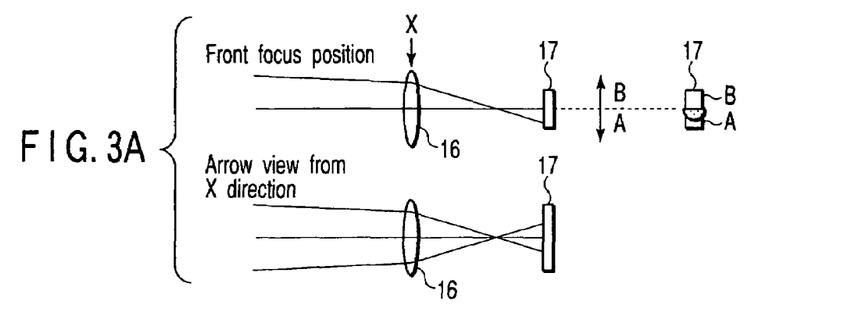
FIG. 3A to FIG. 3C are diagrams to explain a detection method of a focusing state in the first embodiment.

On the contrary, in the case where the sample movement stage 21 is over the focused position, i.e. near the objective 10a (hereinafter called a "front focus"), the spot image is imaged on the sensor A side as shown in FIG. 3A.

Consequently, at the two positions of the rear focus and the front focus, since the whole spot light cannot be contained within the surface of the photo-detector 17, a detected intensity becomes low.

Figure 3B:
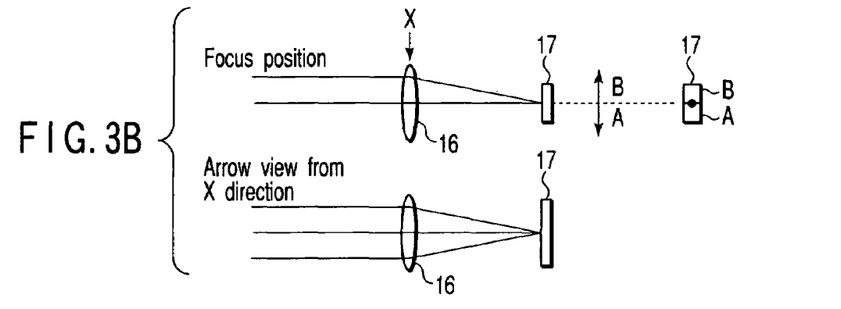
Figure 3C:
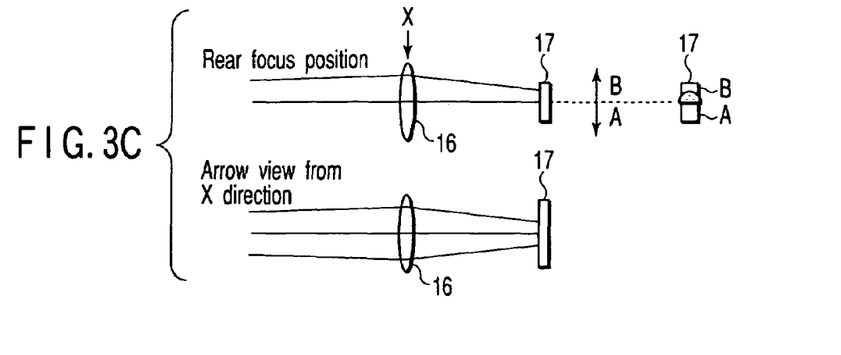

On the other hand, the spot image at the focused position is imaged, as shown in FIG. 3B, approximately at the center of the optical axis evenly distributed between the areas of the sensor A and B. Moreover, since the spot light enters wholly into the surface of the photo-detector 17, the intensity becomes maximum.

Figure 4A:
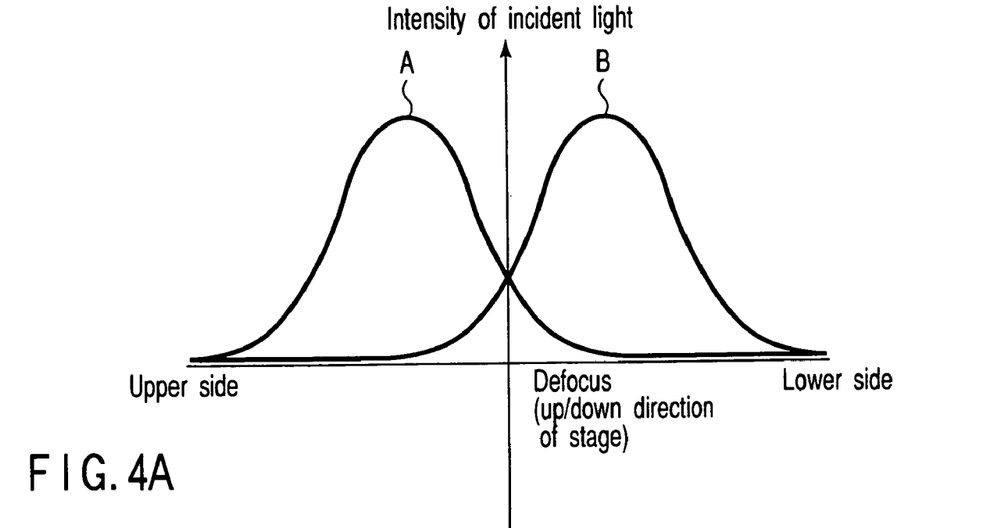
FIG. 4A and FIG. 4B are diagrams to explain a detection method of a focusing state in the first embodiment.
Figure 4B:
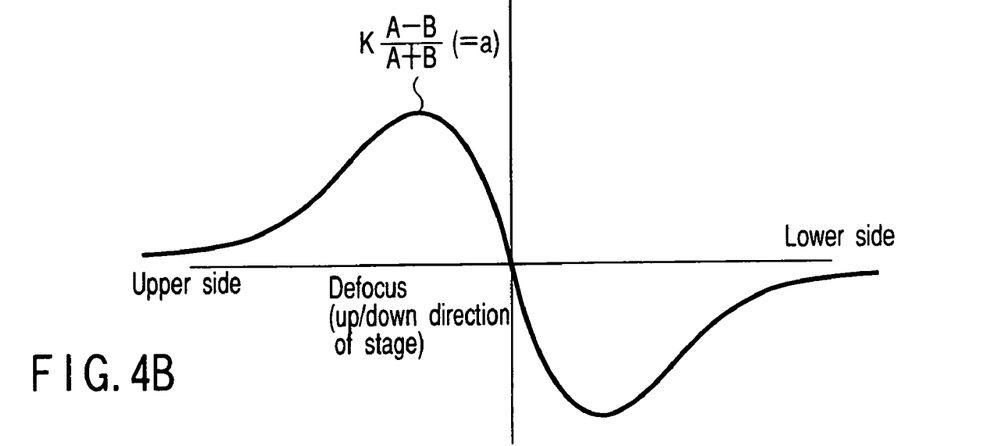

Thereby, detection signals A and B are photo-electrically converted by the photo-detector 17, passing through the amplifier 18 and are detected as the two symmetrical curves on both sides of the focused position, as shown in FIG. 4A where the horizontal axis represents the up/down (defocus) direction of the sample movement stage 21. These signals A, B are converted into digital signals by A/D convert 19 and then input to the control unit 20. The calculation part 20a calculates, from the input signals A and B using the following equation, error signals a, which show continuous change of voltage level crossing the zero at the focused position and having inverse sign on both sides of the focused position:

$$a = K \times (A-B)/(A+B) \quad (1)$$

In the equation, K is a gradient (coefficient) and a value input to the calculation part 20a from the external control unit 22 with a communication command via the communication part 20b of the control unit 20, and it is set within the range of 0.1 to 10.

Figure 5A:
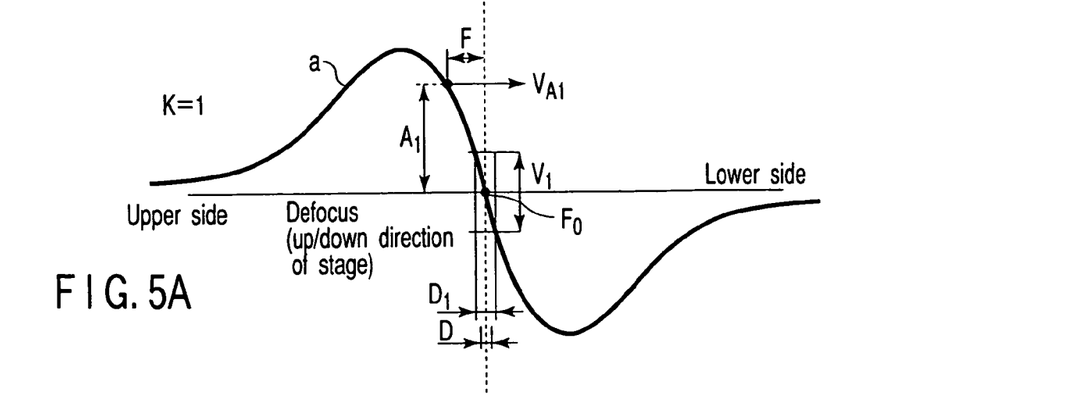
FIG. 5A to FIG. 5C are diagrams to explain a relationship between an error signal and a gradient K in the first embodiment.
Figure 5B:
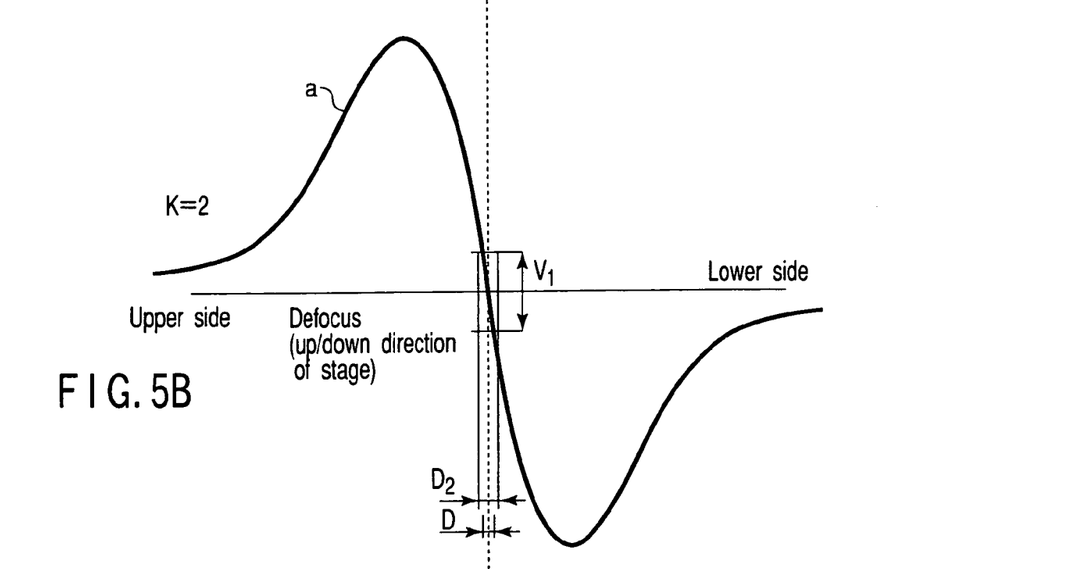
Figure 5C:
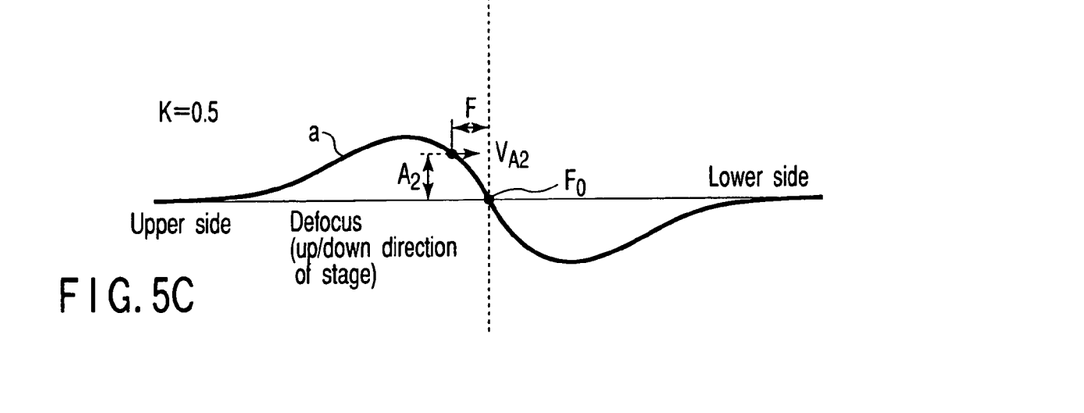

According to the equation, if K=1, K=2 and K=0.5, the error signal a is converted to have a waveform shown in FIG. 5A, FIG. 5B, and FIG. 5C, respectively.

Next, the control unit 20 compares the level of the error signal a calculated according to the equation (1) with a predetermined value V as the output voltage range Vc. This predetermined value V is necessary for setting the output voltage range when the error signal is output in analogue from the control unit 20 and is input to the calculation part 20a from the external control unit 22 with a communication command via the communication part 20b of the control unit 20.

Here, if the absolute value of the error signal a is larger than V, namely, |K×(A−B)/(A+B)|>V, the value of the error signal a is forcedly fixed to V or −V.

Figure 6A:
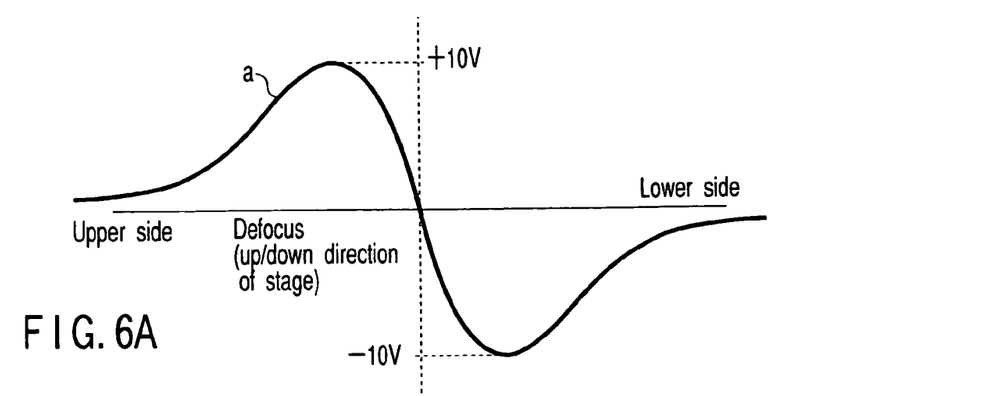
FIG. 6A and FIG. 6B are diagrams to explain a relationship between an error signal and an output voltage range in the first embodiment.
Figure 6B:
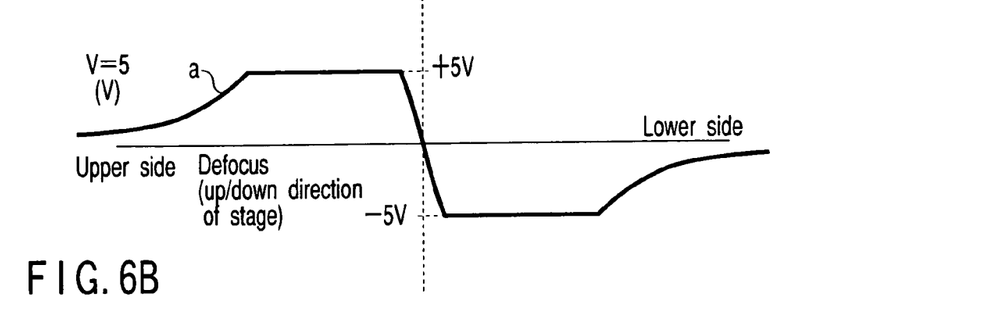

For example, as shown in FIG. 6A, in the case where a waveform of the error signal a is within the output range of ±10 (V), by setting the condition where the predetermined value V=5 (V), the waveform of the error signal a is converted to be such a waveform as shown in FIG. 6B, and the output range of the error signal is always involved in the range of ±6 (V). After these processes, the control unit 20 outputs the error signal a representing the focusing state of the observation sample S as an analogue signal by part of an A/D converter not shown in the drawing.

Next, the AF operation on the external unit 200 side will be described.

In such a case, after a start instruction of detecting the focused position is given with a communication command by the external control unit 22, the AF operation by the external control unit 22 is performed on the basis of the error signal a output from the control unit 20.

At this time, the external control unit 22 moves the sample movement stage 21, according to the error signal a, to the point where the following relationship is satisfied:

$$\int \{K(A-B)/(A+B)\}=0 \qquad (2)$$

That is to say, when the sign of the error signal a is (+) the sample movement stage 21 is moved to the lower side shown in the drawing, and when the sign of the error signal a is (−) the sample movement stage 21 is moved to the upper side shown in the drawing. Next, when the absolute value of the error signal a falls within the value, which has been prescribed in storage part not shown in the drawing, the AF operation is stopped under the decision that the focused position is reached.

In such an AF operation, a period of time necessary to reach the focused position is an important factor in deciding whether its performance is good or poor. Therefore, the external control unit 22 changes the moving speed of the sample movement stage 21 according to a voltage value of the error signal a input from the control unit 20. That is to say, when the voltage of the error signal a is high, the sample movement stage 21 is moved at high speed under the decision that the observation sample S is located at the position far from the focused position. On the contrary, when the voltage of the error signal a is low, the sample movement stage 21 is moved at low speed under the decision that the observation sample S is located at the vicinity of the focused position. In such a manner reduced is a focusing time.

However, when the external control unit 22 developed independently by a system manufacturer separately from the focusing state signal output apparatus 100 is utilized as that of the external unit 200, the following problems will occur. For example: (1) when a waveform of the error signal is fixed to one kind, a lot of modification on the sequence may be necessary to realize a stable AF operation depending on the sort of the external control unit 22; (2) it is difficult to utilize sufficiently the error signal a of the focusing state signal output apparatus 100; (3) a lot of man-hour and time is consumed in setting the sample movement stage 21.

In order to avoid the above problems, before starting the AF operation in the external control unit 22, the gradient of the error signal a, i.e. the gradient K described in FIG. 5A to FIG. 5C, is set by the communication command to the appropriate value considering the characteristics of the external control unit 22. Thereby, the error signal a which is most suitable for driving the sample movement stage 21 is obtained from the focusing state signal output apparatus 100 and therefore the stable AF operation can be obtained without changing the sequence of the external control unit 22.

For example, for the external control unit 22 with a stage driving speed too fast considering the voltage level of the input error signal a, occurs the so-called hunting phenomenon where the control of the stage position happens to oscillate on both sides of the focused position. That is to say, in FIG. 5A, when the observation sample S is located at the position apart by F from the focused F0, the voltage of the error signal becomes to A1. When the AF operation is performed by a driving amount VA1 corresponding to the voltage A1 until the signal representing the next focusing state is output against the voltage A1, the observation sample S happens to pass the focused position F0. In such a case, the error signal a having the waveform shown in FIG. 6C is used setting K=0.5 in the external control unit 22. Thereby, the voltage of the error signal a located at the position apart by F from the focused position F0 comes to A2. Since a driving amount corresponding to this voltage A2 becomes to VA2, the observation sample S turns not to pass the focused position F0 and the observation sample S can be positioned at the focused position F0 without generating the hunting phenomenon.

In the case where decision of the range of focusing is judged by the voltage of the error signal a, a slow rate of change of the error signal a corresponding to the amount of displacement of the sample movement stage 21 makes the precise focusing impossible.

For example, in FIG. 5A, it is assumed that the depth of focus of an objective is D. In this case, when V1 is the voltage range, which is set in the storage part of the external control unit 22 and is judged to correspond to the focused position F0, the focusing operation is finished within the range of D1 resulting in inability to focus with the precision smaller than the depth of focus. In such a case, the error signal a having the waveform shown in FIG. 5B is used setting K=2 in the external control unit 22. Thereby, although the voltage range, which is judged to correspond to the focusing position F0, is also V1 as above, the focusing operation can be performed within the range of D2 in FIG. 5B realizing the high precision focusing narrower than the depth of focus D of the objective used in there.

Now, since the output signal from the control unit 20 of the focusing state signal output apparatus 100 is an analogue output, the level of the signal must be suppressed to fall within the input voltage range of the external control unit 22.

In such a case, by setting the output voltage range of the error signal a, by the communication command, in consideration of the output voltage range of the external control unit 22, break of the circuit and unstable AF operation can be prevented.

For example, when the voltage range of the error signal a from the control unit 20 is ±10 (V) as shown in FIG. 6A and the input voltage range of the external control unit 22 itself is within ±5 V, the output voltage range is set to V=5 V and thereby the error signal a falling within the output range of ±5 (V) as shown in FIG. 6B should never be output beyond the range of ±5 V.

Such a setting is effective, for example, in the case where the external control unit 22, on which the driving unit liable to occur errors such as pull out by driving the stage with the error signal a higher than 5 V is mounted, is used and therefore the stable AF operation turns to be possible using the error signal shown in FIG. 6B.

Figure 7:
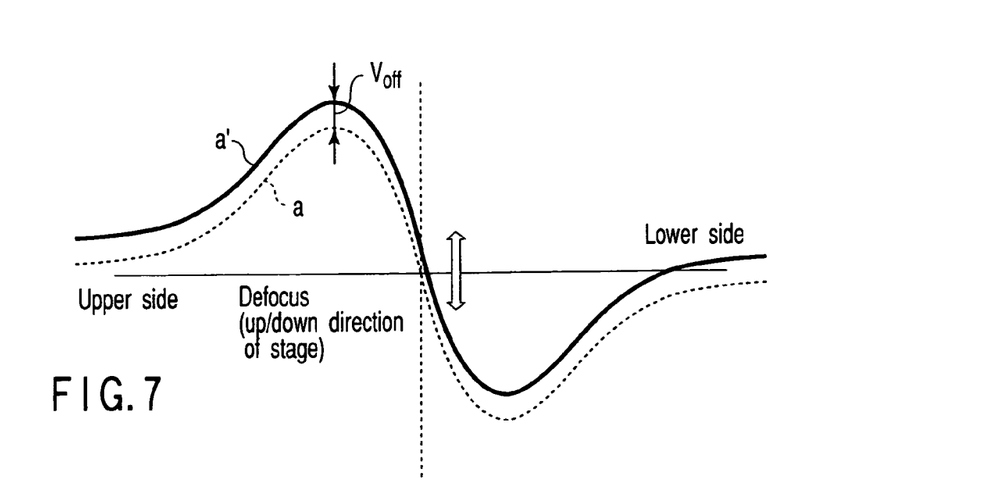
FIG. 7 is an illustrative diagram showing a relationship between an error signal and an offset voltage in the first embodiment.

On the other hand, the control unit 20 can set the offset voltage Voff of the error signal a by the communication command from the external control unit 21. Here, as shown in FIG. 7, the offset voltage Voff is set corresponding to the voltage level Va of the error signal a shown as a broken line in the drawing, and outputs the error signal a' shown as a solid line in the drawing output. Thereby, for example, drift of the error signal a accompanying with temperature changes or the like can be compensated to adjust the error signal a more precisely.

Figure 8:
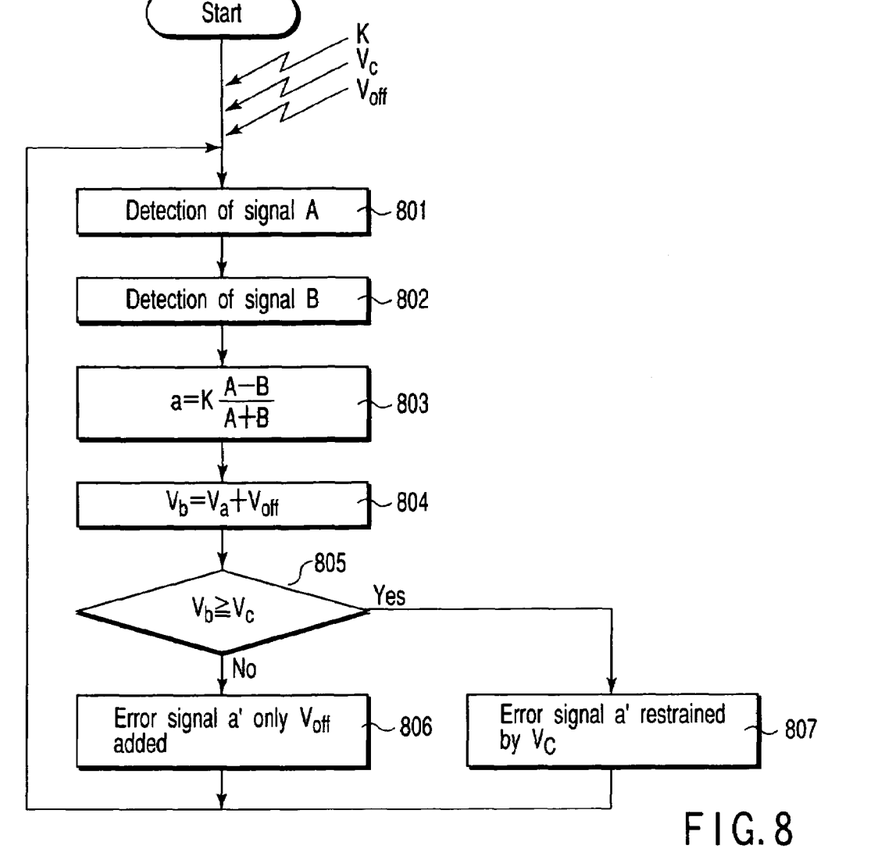
FIG. 8 is an illustrative diagram showing sequential operations of the first embodiment.

A sequence of the operations described above is concretely performed according to a flow chart shown in FIG. 8.

Here, first, a gradient K near the origin, an output voltage Vc, an offset voltage Voff, etc. are set, if necessary, by the external control unit 22 of the external unit 200 as information for setting the waveform of the error signal a. Such information is sent by the communication command to the control unit 20 of the focusing state signal output apparatus 100.

At this moment, in the control unit 20, detection signals A, B detected by the photo-detector 17 are taken in by the calculation unit 20a (Steps 801, 802), and the error signal a as a focusing state signal is calculated according to Equation (1) (Step 801). Here, either of the step 801 or step 802 can be processed precedent to the other.

Next, when the offset voltage Voff is set, the voltage Vb is obtained by adding the offset voltage Voff to the voltage level Va of the error signal a and the error signal a' corresponding thereto is set (Step 804).

Then, the voltage level Vb of the error signal a' is compared to the output voltage range Vc (Step 805). When Vb is lower than Vc in Step 805, the error signal a' to which the offset voltage Voff has been added is, as it is, output to the external control unit 22 as the focusing state signal (Step 806). When Vb is higher than or equal to Vc in Step 805, the error signal a', the output range of which is restrained by the output voltage range Vc, is output to the external control unit 22 as the focusing state signal (Step 807).

Therefore, following the above steps, even in the case that the focusing state signal output apparatus 100 is provided independently of the external unit 200 having focusing part with different characteristics, the gradient of the error signal a near the origin, the range of output voltage, the offset voltage, etc., which are output from the focusing state signal output apparatus 100, can be freely changed according to the waveform setting information given to the focusing state signal output apparatus 100 from the external control unit 22 disposed on the external unit 200 side. Consequently, since the optimum error signal a can be provided for the external control unit 22 having various driving part, a high precision and high speed AF operation turns to be possible avoiding malfunction against any external control unit 22, and a widely available, high precision and high speed AF sequence can be designed.

Further, by storing the waveform setting information of the error signal a every magnification of objectives, every type of microscopy, or every observation samples S, the stable AF operation can also be realized more easily.

Next, the second embodiment of the present invention will be described.

In the second embodiment, since the schematic configuration of the focusing state signal output apparatus is the same as that in FIG. 1, FIG. 1 is used as reference. Further, the control unit 20 outputs, according to the output from the photo-detector 17, the error signal a representing the focusing state of the observation sample S as well as the various focusing decision signals b, the AF operation signal e.

In the first embodiment, described is the case where the external control unit 22 performs the AF operation according to the error signal a from the control unit 20. Adjustment of the gradient of the error signal a (changeable by the value of K) and restraint of the voltage level (changeable by the value of V), which are input to the external control unit 22, can be optimized by a communication command from the external control unit 22 to the control unit 20.

Additionally, the following items are necessary to perform higher precision and higher speed AF operation in the external control unit 22.

(a) The predetermined value TH1 as a threshold by which the focused position is decided is stored in the inside of the external control unit 22 every state of various objectives or types of microscopy. And, when the gradient of the error signal a is changed, the predetermine value TH1 is also changed corresponding to the change.

(b) In order to reduce the AF time from the stage position far from the focused position (=greatly defocused position) or in order to avoid the unstable AF operation at the position concerned, decision part to decide whether it is a greatly defocused position or not.

First, the case (a) will be described. In order to decide whether a certain position is the focused position, it is necessary to decide whether the level of the error signal a falls within the range of the predetermined value TH1 or not. Further, these predetermined values TH1 must be stored beforehand for every sort of the objectives or every type of microscopy.

Figure 9:
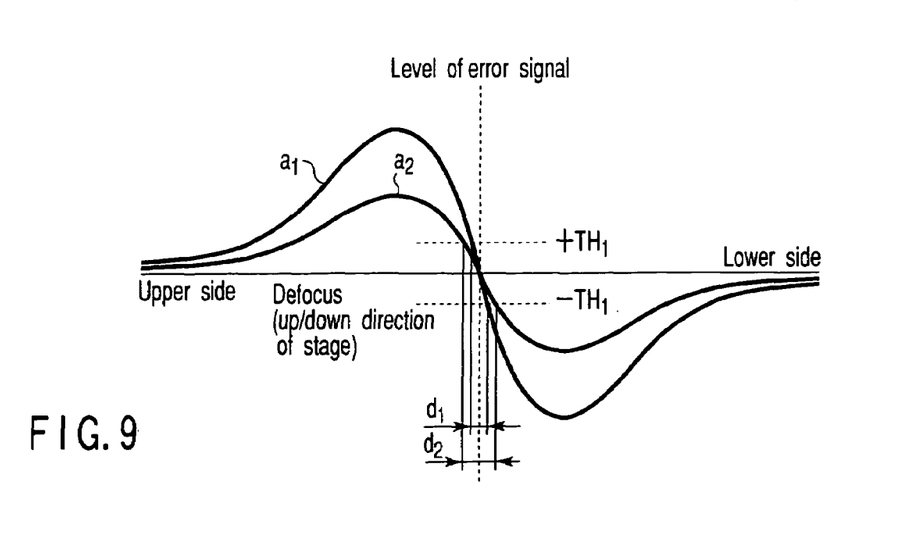
FIG. 9 is an illustrative diagram showing a relationship between an error signal and a focusing decision range in the second embodiment.

Moreover, although the predetermined value TH1 is stored, the stage position range within which focusing is decided is deviated by changing the gradient (K value) of the error signal. For example, in FIG. 9, focusing decision range is D1 when the predetermined value TH1 is applied to the error signal a1 at K=1. Comparatively speaking, when the predetermined value TH1 is applied to the error signal a2 at K=0.5, focusing decision range becomes to D2 broader than D1, turning out to be poorer in focusing precision as a result. Therefore, when the gradient of the error signal a is changed by the communication command, the high precision AF operation cannot be expected without changing the predetermined value TH1 at the same time.

Although it is possible to mount the above-mentioned function on the external control unit 22, the measures are lacking in wide availability considering various types of stage control, because of requiring the storage of parameters and the function to change the predetermined value TH1. Therefore, in the second embodiment, the predetermined value TH1 used for the focusing decision is stored in the control unit 20 and also can be changed by the communication command from the external control unit 22. Further, the control unit 20 outputs, as the focusing decision signal b, a logic signal which becomes active when the stage reaches the position corresponding to the condition that the error signal falls within the predetermined value TH1.

Figure 10:
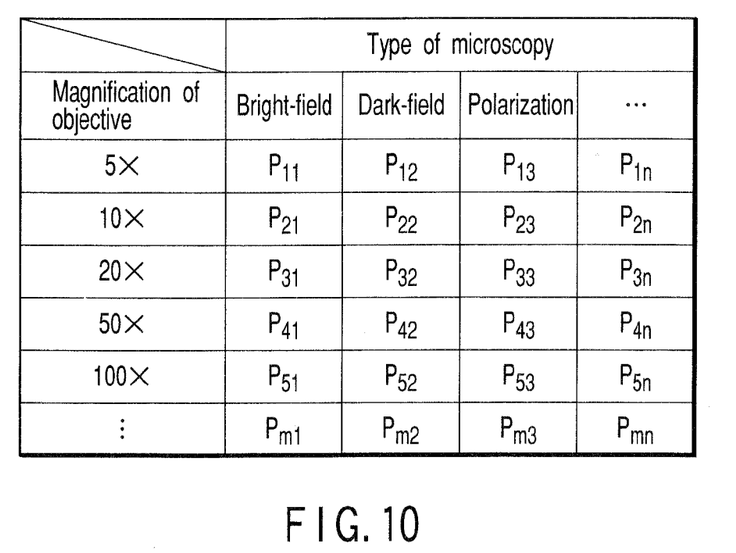
FIG. 10 is a diagram showing a table storing predetermined values for every magnification of an objective and every type of microscopy in the second embodiment.
Figure 11:
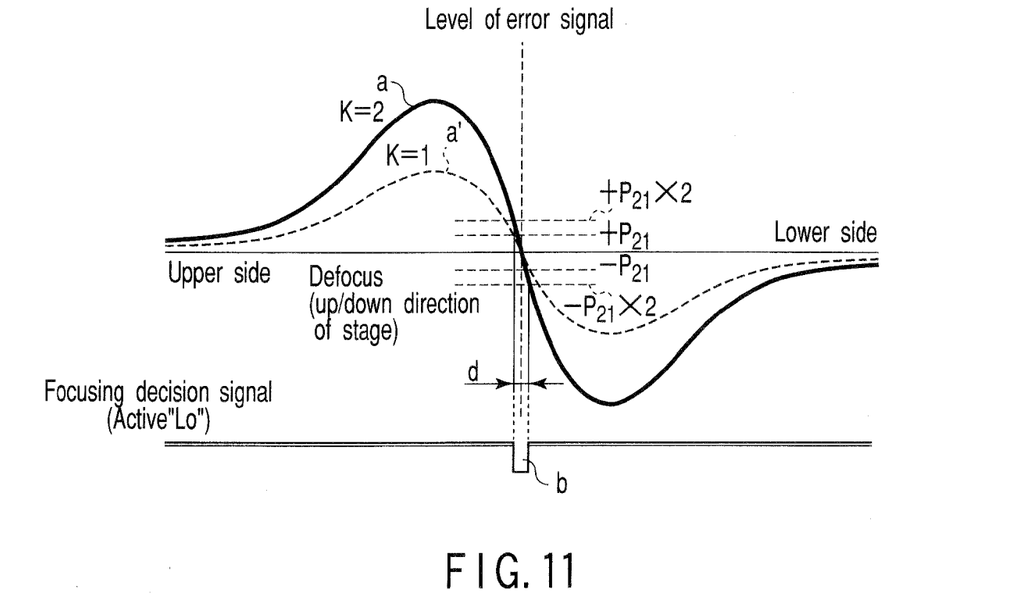
FIG. 11 is an illustrative diagram showing a focusing decision signal corresponding to an error signal in the second embodiment.

At this moment, the control unit 20 has memorized and stored beforehand the predetermined value TH1 every magnification of the objectives, every type of microscopy (bright-field, dark-field, polarized, etc.) as a table shown in FIG. 10. Then, the information such as the magnification of the objective, the type of microscopy is input by the communication command from the external control unit 22 via the communication part 20b of the control unit 20, and the predetermined value TH1 corresponding thereto is selected from the table. Further, when the gradient K of the error signal a is input from the external control unit 22, $$TH1 \times K \qquad (3)$$

is calculated for the selected predetermined value TH1, setting the calculated value to the new predetermined value TH1, as shown in FIG. 11 the focusing decision signal b corresponding to this predetermined value TH1 is output.

For example, in the case where the gradient K=2, the type of microscopy is a bright-field type, the objective of 10 power is loaded, P21 is selected as the predetermined value TH1 from the table shown in FIG. 10, and then P21×2 is set to the new predetermined TH1.

Thereby, as shown in FIG. 11, it is informed to the external control unit 22 that the observation sample S is at the focused position, by outputting, as the focusing decision signal b, the logic signal which becomes active in the period d shown in the drawing by the predetermined value TH1 =±(P21×2) set corresponding to the error signal a at K=2. Here, the error signal a has linearity near the focused position. Therefore, using the predetermined value TH1 calculated according to Equation (3), output period d of the focusing decision signal b becomes almost constant to assure the stable AF precision. Then, the external control unit 22 receives the focusing decision signal b and stops motion of the stage, and the AF operation is finished.

It is to be noted that, in FIG. 11, a' is the error signal at K=1 and in this case the predetermined TH1 =±(P21) is set, and the logic signal which becomes active in the period corresponding to the predetermined TH1 is output as the focusing decision signal b.

By part of such functions as mentioned above, it becomes unnecessary for the external control unit 22 to store the predetermined value TH1 corresponding to the magnification of the objective or the type of microscopy. Further, even when the waveform of the error signal a is changed by the value of K, the AF operation can always be performed at the same precision. Further, since the AF operation can be finished only on the basis of the focusing decision signal b, the stable AF operation can be realized without using complicated focusing decision sequence. Still further, change of the AF precision corresponding to a start of the observation sample S can be easily performed by the communication part.

Next, the case (b) will be described: the error signal at the greatly defocused position may have, as shown by P in FIG. 12B, a plurality of portions satisfying $$K\{(A-B)/(A+B)\}=0 \tag{4}.$$

Figure 12A:
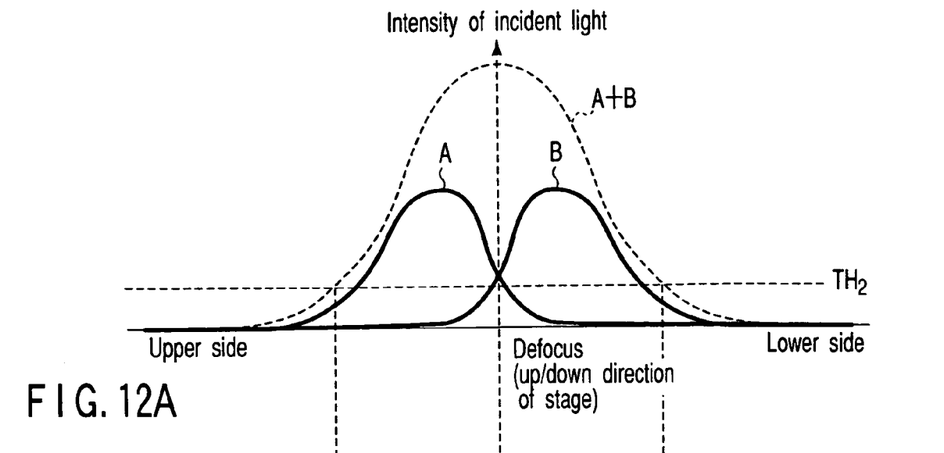
FIG. 12A to FIG. 12C are diagrams to explain an AF operation enable signal corresponding to an error signal in the second embodiment.

This phenomenon is, as apparent from FIG. 12A, such that a noise component such as a stray light beam prevails in the range where the detected signals A, B corresponding to the laser beam imaging on the photo-detector 17 comes extremely small, resulting in near 0 of Equation (4), i.e. that it is mistaken for the focused position.

Figure 12B:
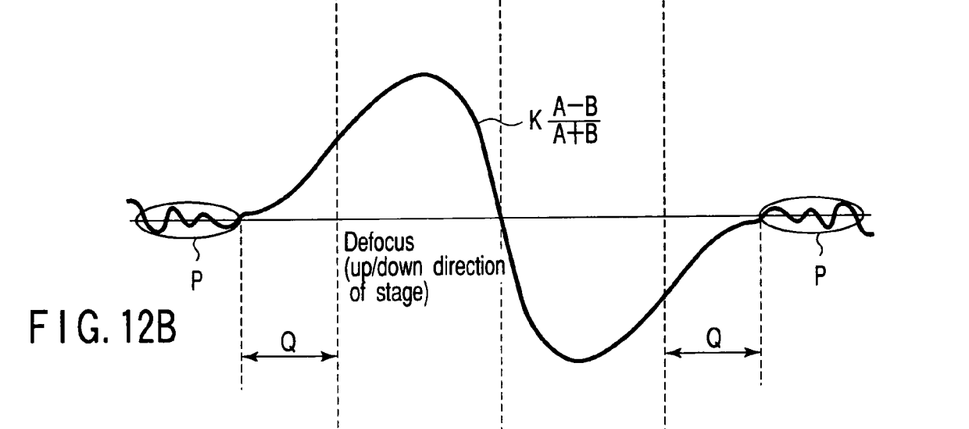
Figure 12C:
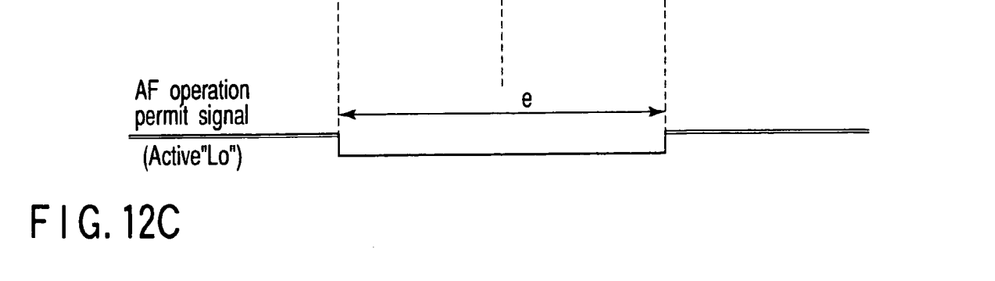

In order to avoid this phenomenon, as shown in FIG. 12A, a predetermined threshold TH2 is set for the sum A+B of the detected signals A, B and a logic signal which becomes active only in the case of A+B>TH2 as shown in FIG. 12C is output as an AF operation enable signal e from the control unit 20 to the external control unit 22.

In the external control unit 22, malfunction at the greatly defocused position can be avoided by continuing the AF operation without deciding the focused position at the stage position where the AF operation enable signal e is not active, that is to say, outside the range of AF operation enable signal e as shown in FIG. 12C.

Further, with regard to such an AF sequence that the low speed AF operation is performed in the range of a relatively low voltage level of the error signal a, for example in the range Q in FIG. 12B, by changing a sequence into performing a high speed search independently of the voltage level of the error signal a outside the range of the AF operation enable signal e, and also by performing a focusing operation at the driving speed corresponding to the level of the error signal a only within the range of the AF operation enable signal e, reduction of the AF operation time can be achieved.

Moreover, with regard to the threshold TH2, since the values set every magnification of the objectives and every type of the microscopy are stored beforehand, the optimum threshold TH2 can be applied only by inputting the information about the magnification of the objectives or the types of the microscopy via a communication command to the control unit 20. Here, "optimum" part larger than the signal intensity of (A+B) generated by noise components such as a stray light beam in each type of the microscopy and each magnification of the objectives.

Still further, the threshold TH2 can be changed into an appropriate value by the communication command. Thereby, for example, when the AF operations are repeated with a specific observation sample S or a specific stage range, the stable AF performance and the improvement of the AF operation time can coexist by lowering further the level of the threshold TH2.

It is to be noted that, in each of the above-mentioned embodiments, adjustment of the distance between the observation sample S and the objective 10a were performed by driving the sample movement stage 21, however, for example by driving up and down the main body 13 of the electric revolver on which the objective 10a is mounted obtained is the entirely similar effect. Further, in the above embodiments, the AF optical system of the so-called active type is described, however, with regard to the AF optical system of the so-called passive type where a visible light image from the observation sample is projected on the plural image pick-up surfaces with different lengths of an optical path and the error signal is generated by calculating the contrast among them, the entirely similar effect can be obtained as far as the manner of using the error signal is equivalent. Still further, above described is the microscope to which the focusing state signal output apparatus is applied, but the apparatus can be applied to another optical equipment.

It is to be noted that the present invention should not be limited to the above embodiments and can be modified variously at working of the invention within the scope of the gist.

Figure 13:
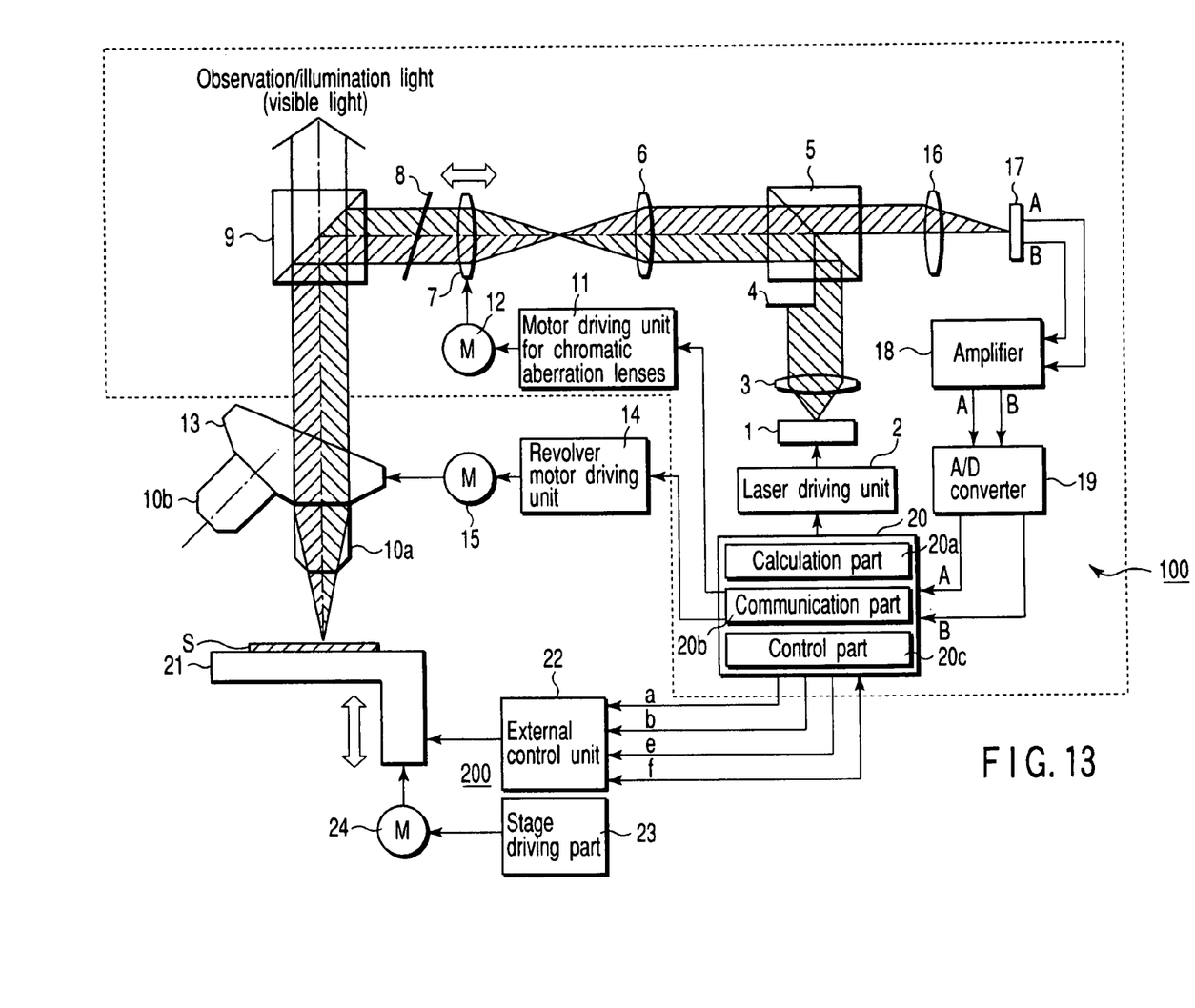
FIG. 13 is a diagram showing another example of the configuration where a revolver motor driving unit, a revolver motor, etc. shown in FIG. 1 are configured to be parts of the external equipment.

In each above-mentioned embodiment, the revolver motor driving unit 14, the revolver motor 15, etc. are described as parts of the focusing state signal output apparatus 100, but they are not limited by the description. FIG. 13 shows another configuration where the revolver motor driving unit 14, the revolver motor 15, etc. in FIG. 1 are parts of the external equipment 200. Furthermore, in FIG. 13, marking the like parts in FIG. 1 with the like reference letters and numerals, the detailed description will be omitted.

In the configuration according to FIG. 13, a revolver motor 15 is not driven by part of outputting a control signal from a control part 20c directly to a revolver motor driving unit 14, but the revolver motor 15 is driven by part of controlling the revolver motor driving unit 14 by an external control unit 22 on the basis of the control signal output from the control part 20c of a control unit 20 to the external control unit 22. Furthermore, in FIG. 13, a stage motor driving unit 23 and stage motor 24 are added in order to make them synchronize with the driving unit of the revolver 13, and such configuration is the same even in FIG. 1.

By such modification, it is obvious that the same effect as that of the above embodiment is obtained.

The following inventions can be extracted from each above-mentioned embodiment. Each of the following inventions can be applied singly or can be applied in proper combination.

A focusing state signal output apparatus according to the present invention is characterized by comprising: an optical detection part configured to detect a reflected light from a sample; and an output part configured to output an a focusing state signal, which is a signal showing a focusing state of the sample, has inverse sign on both sides of a focused position and shows continuous change of a voltage level crossing a zero at the focused position.

The following modes are preferable.

(1) The output part sets a predetermined threshold value to the focusing state signal, and outputs a focusing judgment signal based on large or small between the focusing state signal and the threshold value.

(2) The threshold value set to the focusing state signal can be changed based on an instruction from a focusing part.

(3) The output part sets a predetermined threshold value to a signal from the optical detection part, and outputs a focusing operation enable signal based on large or small between these signal and the threshold value.

(4) The focusing state signal output apparatus is attached attachably and detachably in an optical equipment which comprises a part to adjust a relative distance between a stage on which a sample is set and an objective, a waveform transforming part configured to transform to an arbitrary waveform based on wave setting information given from an external device of the focusing state signal output unit is further provided, and the output part outputs the waveform transformed by the waveform transforming part.

(5) The waveform setting information contains at least one of an inclination of the focusing state signal near an origin, a range of an output voltage and an offset voltage.

According to the embodiments of the present invention, since a gradient near the origin of a focusing state signal representing a focusing state of a sample, an input voltage range, and an offset voltage can be set as desired on the basis of waveform setting information supplied from focusing part side, the focusing state signal of the optimum waveform can be provided for the focusing part having various characteristics, and a high precision and high speed AF operation avoiding malfunction for any focusing part turns to be possible.

Further, according to the embodiments of the present invention, a focusing decision signal having a constant output period at all times can be output by part of setting a threshold for the focusing state signal.

Further, according to the embodiments of the present invention, since it is configured that an AF operation enable signal is output by part of setting a threshold also for a signal from photo-detecting part, AF malfunction (pseudo-focus) at a greatly defocused position can be avoided by continuing the AF operation without deciding the focused position outside the range of the AF operation enable signal.

Still further, in the above embodiments, the inventions at various stages are included and various inventions can be extracted properly combining the plural constituent features disclosed therein. For example, in the case where the problems described in the column on the problems to be solved by the invention can be solved and the effect described in the column on the effect of the invention can be obtained in spite of eliminating some constituent features out of the whole constituent features shown in the embodiments, the configuration from which the above constituent features are eliminated can be extracted as a new invention.

According to a focusing state signal output apparatus according to the present invention, a focusing state signal of the optimum waveform can be provided for the focusing part having various characteristics, and a high precision and high speed AF operation turns to be possible.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An autofocus system comprising:
a focusing state signal output apparatus;
a stage on which a sample is set;
a focusing part which adjusts a relative distance between the stage and an objective lens; and
an external control unit, which is external to the focusing state signal output apparatus, and which controls the focusing part;
wherein the focusing state signal output apparatus comprises:
an optical detection part which detects light reflected from a sample to carry out photoelectric conversion;
a control unit which generates a focusing state signal representing a focused position and a focusing state of the sample based on an electrical signal from the optical detection part;
an output part which outputs the focusing state signal to the external control unit;
a storage part which stores a threshold value corresponding to a magnification of the objective lens and a type of microscopy of a microscope;
wherein the focusing state signal has inverse signs on respective sides of a focused position of the focusing part with respect to the sample, and the focusing state signal shows continuous change of a voltage level crossing a zero at the focused position, and
wherein the control unit is configured to transform the focusing state signal to an arbitrary wave form based on waveform setting information from the external control unit, the control unit sets a threshold with respect to the focusing state signal according to at least one of (i) a change in inclination of the focusing state signal and (ii) the magnification of the objective lens and the type of microscopy of the microscope, and the control unit outputs a focusing judgment signal to the external control unit based on a result of a comparison between the focusing state signal and the set threshold.

2. The autofocus system according to claim 1, wherein the control unit changes a setting of at least one of the inclination of the focusing state signal near the zero-crossing point, a range of an output voltage of the focusing state signal, and an offset voltage applied to the focusing state signal, based on the waveform setting information from the external control unit.

3. The autofocus system according to claim 1, wherein the control unit comprises a calculation part which calculates the focusing state signal, and a communication part which exchanges data with the focusing part.

4. The autofocus system according to claim 1, wherein the threshold set for the focusing state signal is changeable based on an instruction from the external control unit.

5. The autofocus system according to claim 1, wherein the control unit sets a predetermined second threshold for the signal from the optical detection part, and outputs a focusing operation enable signal to the external control unit based on a result of a comparison between the signal from the optical detection part and the second threshold.

6. The autofocus system according to claim 5, wherein the control unit includes a storage part which stores the second threshold corresponding to a magnification of the objective lens and a type of microscopy of a microscope.

7. The autofocus system according to claim 5, wherein the second threshold set for the signal from the optical detection part can be changed based on an instruction from the external control unit.

8. The autofocus system according to claim 1, wherein the control unit sets the threshold with respect to the focusing state signal according to both (i) the change in inclination of the focusing state signal and (ii) the magnification of the objective lens and the type of microscopy of the microscope.

9. The autofocus system according to claim 1, wherein the storage part stores a plurality of threshold values in correspondence with a plurality of magnifications of the objective lens and a plurality of types of microscopy of the microscope;
wherein the control unit sets the threshold with respect to the focusing state signal by selecting one of the threshold values from the storage part based on the magnification of the objective lens and the type of microscopy of the microscope, and multiplying the selected threshold value by the change in inclination of the focusing state.

10. The autofocus system according to claim 9, wherein the magnification of the objective lens and the type of microscopy of the microscope and the change in inclination of the focusing state signal are supplied to the control unit by the external control unit.

11. An autofocus system comprising:
a focusing state signal output apparatus;
a stage on which a sample is set;
a focusing part which adjusts a relative distance between the stage and an objective lens; and
an external control unit, which is external to the focusing state signal output apparatus, and which controls the focusing part;
wherein the focusing state signal output apparatus comprises:
an optical detection part which detects light reflected from a sample to carry out photoelectric conversion;
a control unit which generates a focusing state signal representing a focused position and a focusing state of the sample based on an electrical signal from the optical detection part;
an output part which outputs the focusing state signal to the external control unit; and
a storage part which stores a threshold corresponding to a magnification of the objective lens and a type of microscopy of a microscope
wherein the focusing state signal has inverse signs on respective sides of a focused position of the focusing part with respect to the sample, and the focusing state signal shows continuous change of a voltage level crossing a zero at the focused position, and
wherein the control unit is configured to transform the focusing state signal to an arbitrary wave form based on waveform setting information from the external control unit, the control unit sets the threshold according to the magnification of the objective lens and the type of microscopy of the microscope, and the control unit outputs a focusing operation enable signal to the external control unit based on a result of a comparison between the signal from the optical detection part and the threshold.

12. An autofocus system comprising:
a focusing state signal output apparatus;
a stage on which a sample is set;
a focusing part which adjusts a relative distance between the stage and an objective lens; and
an external control unit, which is external to the focusing state signal output apparatus, and which controls the focusing part;
wherein the focusing state signal output apparatus comprises:
an optical detection part which detects light reflected from a sample to carry out photoelectric conversion;
a control unit which generates a focusing state signal representing a focused position and a focusing state of the sample based on an electrical signal from the optical detection part;
an output part which outputs the focusing state signal to the external control unit; and
a storage part which stores a first threshold for the focusing state signal and a second threshold for a signal from the optical detection part corresponding to a magnification of the objective lens and a type of microscopy of a microscope;
wherein the focusing state signal has inverse signs on respective sides of a focused position of the focusing part with respect to the sample, and the focusing state signal shows continuous change of a voltage level crossing a zero at the focused position, and
wherein the control unit is configured to transform the focusing state signal to an arbitrary wave form based on waveform setting information from the external control unit, the control unit sets the first threshold and the second threshold according to the magnification of the objective lens and the type of microscopy of the microscope, and the control unit outputs a focusing operation judgment signal to the external control unit based on a result of a comparison between the focusing state signal and the first threshold and outputs a focusing operation enable signal to the external control unit based on a result of a comparison between the signal from the optical detection part and the second threshold.

* * * * *